US012160127B2

(12) United States Patent
Lardieri et al.

(10) Patent No.: US 12,160,127 B2
(45) Date of Patent: Dec. 3, 2024

(54) BATTERY TERMINAL FIXING APPARATUS AND METHOD FOR POWER EQUIPMENT

(71) Applicant: Honda Motor Co., Ltd., Tokyo (JP)

(72) Inventors: Lawrence J. Lardieri, Greensboro, NC (US); Brian Carl Doklovic, Chapel Hill, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 498 days.

(21) Appl. No.: 17/547,203

(22) Filed: Dec. 9, 2021

(65) Prior Publication Data
US 2023/0187953 A1 Jun. 15, 2023

(51) Int. Cl.
H02J 7/00 (2006.01)
H01M 50/204 (2021.01)
H01M 50/247 (2021.01)
H01M 50/543 (2021.01)
H01R 13/502 (2006.01)
H01R 13/629 (2006.01)

(52) U.S. Cl.
CPC ......... *H02J 7/0045* (2013.01); *H01M 50/204* (2021.01); *H01M 50/247* (2021.01); *H01M 50/543* (2021.01); *H01R 13/502* (2013.01); *H01R 13/629* (2013.01)

(58) Field of Classification Search
CPC .. H02J 7/0045; H01M 50/247; H01M 50/543; H01M 50/204; H01R 13/502; H01R 13/629
USPC ........................................... 320/107
See application file for complete search history.

(56) References Cited

U.S. PATENT DOCUMENTS

| 7,064,519 | B2 | 6/2006 | Ito |
| 7,466,974 | B2 | 12/2008 | Smith |
| 7,618,741 | B2 | 11/2009 | Casalena et al. |
| 8,389,143 | B2 | 3/2013 | Robetakamp et al. |
| 9,368,765 | B2 | 6/2016 | Taga |
| 11,031,730 | B2 | 6/2021 | Mitter et al. |
| 11,721,987 | B2 * | 8/2023 | Fukuoka ............... H02J 7/0045 307/18 |
| 2015/0077043 | A1 * | 3/2015 | Seidel .................. H02J 7/0042 320/107 |

(Continued)

FOREIGN PATENT DOCUMENTS

CN 201107812 Y 8/2008
CN 202333190 U 7/2012
(Continued)

*Primary Examiner* — Nathaniel R Pelton
(74) *Attorney, Agent, or Firm* — KENEALY VAIDYA LLP

(57) ABSTRACT

A power equipment battery terminal fixing apparatus is disclosed and can include a housing including a frame and a connector biased away from the frame by a spring device. A battery case can be configured to slide into the frame of the housing along a sliding axis. The battery case can include a notch located at a bottom surface of the battery case and configured to receive the connector from the housing therein. The connector can include electrical contacts and alignment elements on a first side of the connector, and the spring device can be located at a second side of the connector opposite the first side of the connector. The alignment elements can prevent movement of the connector with respect to the battery case in a transverse and a vertical direction.

20 Claims, 5 Drawing Sheets

(56) References Cited

U.S. PATENT DOCUMENTS

| | | | |
|---|---|---|---|
| 2020/0176827 A1 | 6/2020 | Mao et al. | |
| 2020/0235366 A1 | 7/2020 | Haino et al. | |
| 2020/0381682 A1 | 12/2020 | Haino et al. | |
| 2021/0043890 A1* | 2/2021 | Altenburger | H01M 50/213 |
| 2021/0119457 A1* | 4/2021 | Kawaki | H02J 7/0045 |

FOREIGN PATENT DOCUMENTS

| | | |
|---|---|---|
| EP | 2416407 B1 | 10/2013 |
| EP | 2280436 B1 | 8/2017 |
| JP | 3884200 B2 | 2/2007 |
| WO | WO2020175883 A1 | 9/2020 |

\* cited by examiner

BATTERY TERMINAL FIXING APPARATUS AND METHOD FOR POWER EQUIPMENT

BACKGROUND

The disclosed subject matter relates to an apparatus and method for fixing a battery to power equipment. More particularly, the disclosed subject matter relates to methods and apparatus for removably connecting a battery to a piece of power equipment in a manner that protects the battery and connection structure from destructive forces transmitted through the use of and power generation of the power equipment.

SUMMARY

Some embodiments are directed to a power equipment battery terminal fixing apparatus, that can include a housing and a battery case. The housing can include a frame and a connector biased away from the frame by a spring device. The battery case can be configured to slide into the frame along a sliding axis. The battery case can include a notch defined by a top wall, a first side wall, and a second side wall, the notch located at a bottom surface of the battery case and configured to receive the connector therein. The first side wall can include a first rib having a longitudinal axis parallel with the sliding axis, and the second side wall can include a second rib having a longitudinal axis parallel with the sliding axis. The connector can be configured to be slidingly received in the notch on the bottom surface of the battery case. The connector can include electrical contacts and alignment elements on a first side of the connector. The spring device can be located at a second side of the connector opposite the first side of the connector.

Some embodiments are directed to a power equipment battery terminal fixing apparatus, that can include a housing having a frame defining a surface and having a rail structure, the housing having a transverse direction, a vertical direction, and a forward direction, each direction being orthogonal to each other. A connector can be moveably connected to the housing and configured to move along the rail structure, the connector including a transverse alignment element and a vertical alignment element and at least one electrical terminal. A spring can be located between the connector and the housing. A battery case can be configured to be placed on the surface of the housing to connect a battery located in the battery case to the at least one electrical terminal of the connector. The battery case can include a transverse alignment structure configured to mate with the transverse alignment element of the connector to prevent movement of the connector relative to the battery case in the transverse direction when the battery case is connected to the connector. The battery case can further include a vertical alignment structure configured to mate with the vertical alignment element of the connector to prevent movement of the connector relative to the battery case in the vertical direction when the battery case is connected to the connector. The battery case can include at least one electrical contact configured to mate with the at least one electrical terminal of the connector. At least one of the transverse alignment element and vertical alignment element can be located on a first side of the connector. The spring can be located at a second side of the connector opposite the first side of the connector.

Some embodiments are directed to a power equipment battery terminal fixing apparatus that can include a housing having a transverse direction, a vertical direction, and a forward direction, each direction being orthogonal to each other. A connector can be moveably connected to the housing, and include a transverse alignment element, a vertical alignment element, a connector front wall, and at least one electrical terminal protruding from the connector front wall. A spring can be located between the connector and the housing. A battery case can be configured to be placed on the housing to connect a battery located in the battery case to the at least one electrical terminal of the connector. The battery case can include a transverse alignment structure configured to mate with the transverse alignment element of the connector to prevent movement of the connector relative to the battery case in the transverse direction when the battery case is placed on the housing. The battery case can further include a vertical alignment structure configured to mate with the vertical alignment element of the connector to prevent movement of the connector relative to the battery case in the vertical direction when the battery case is placed on the housing. The battery case can include an end wall at which at least one electrical contact is located. The transverse alignment structure can be located on the end wall of the battery case, and the transverse alignment element can be located on the connector front wall of the connector such that the transverse alignment structure and the transverse alignment element contact each other when the battery case is placed on the housing and the at least one electrical terminal of the connector is in electrical contact with the at least one electrical contact of the battery case.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
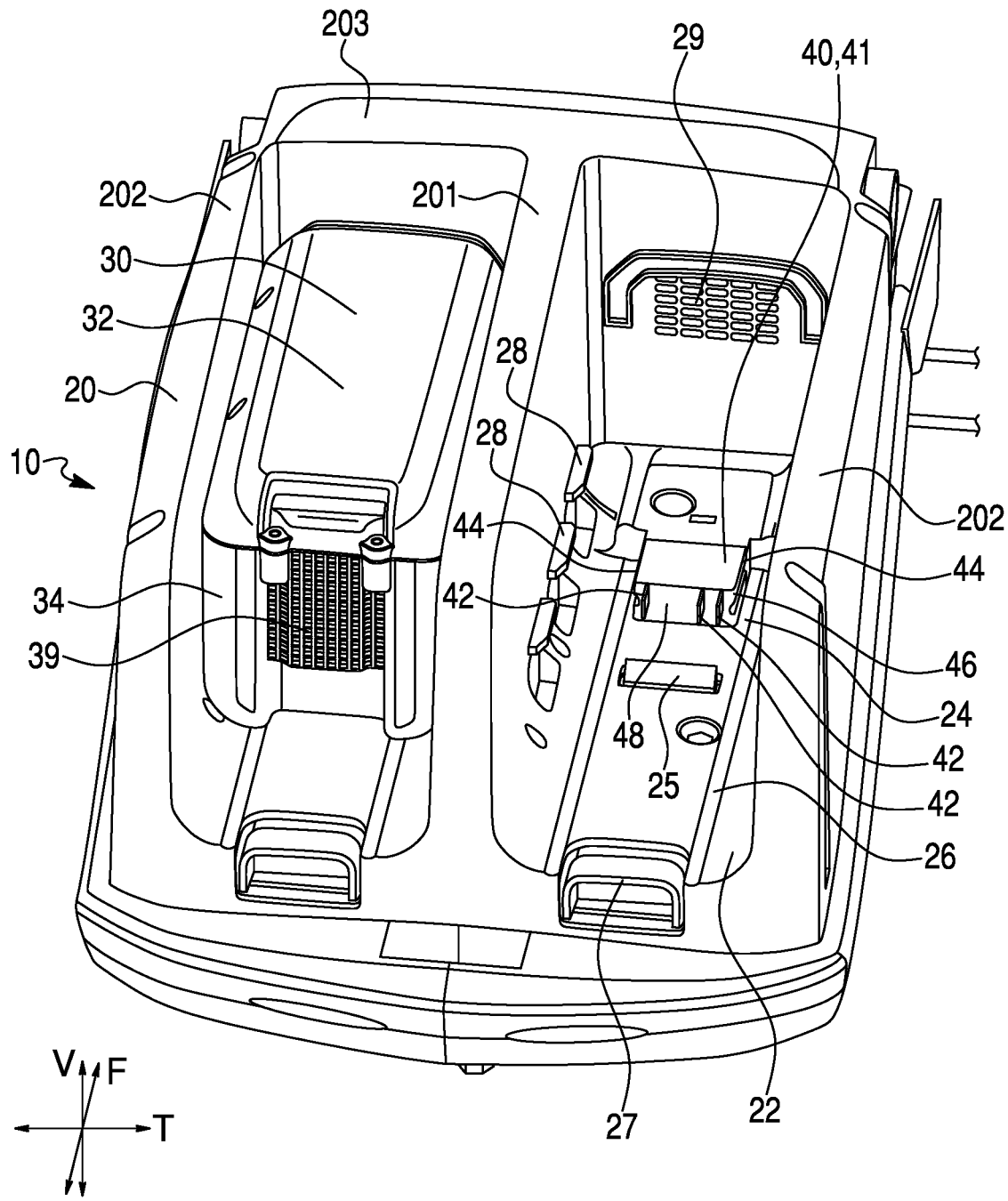
FIG. 1 is a perspective view of a battery terminal fixing apparatus for power equipment made in accordance with principles of the disclosed subject matter.

FIG. 1 illustrates an embodiment of a battery terminal fixing apparatus for power equipment 10 made in accordance with principles of the disclosed subject matter. The equipment 10 can be used in various power equipment applications such as power mowers, hedge trimmers, brush cutters (weed wackers), blowers, power generators, vehicles, power tools, etc. In general, the equipment 10 includes a battery case 30 that can be removably attached to a housing 20 of the power equipment to provide power for operation of the power equipment or possibly in order to receive a charge from the power equipment in certain cases.

The battery terminal fixing apparatus for power equipment 10 can include a battery case 30 that, in the depicted embodiment, is placed into an opening 22 of a housing 20 by sliding the battery case 30 into place along guideways 26 of the housing 20 until a lock recess 303 located on a bottom surface 33 of the battery case 30 latches onto lock 25 located in the opening 22 of the housing 20. A lock release 27 can be provided in the housing 20 and configured to operate with the lock 25 such that when the lock release 27 is actuated by a user (e.g., by pulling or pushing the lock release) that lock can 25 be caused to retract into and/or pivot with respect to the housing 20 away from and releasing from the lock recess 303 on the battery housing 30. Thus, the battery case 30 itself is releasably removable from the housing 20 for storage, or charging, or for use on another piece of equipment.

The housing 20 can include bottom wall 21, a middle wall 201, a pair of outer walls 202 and a rear wall 203. The bottom wall 21, the middle wall 201, the outer wall 202 and the rear wall 203 can border the opening 22. The walls 21, 201, 202, 203 can form at least a portion of a frame of the housing 20.

As shown in FIG. 1, the battery case 30 can include a rear wall 34 that includes vents 39, and a top 32 that is removeable from the battery case 30 via screws or other attachment structures for access to a battery or batteries located within the battery case 30. Vents 39 located in a front wall 31 of the battery case 30 can mate with vents 29 located on the housing 20 such that air can pass from the housing 20 (possibly via forced air induction, via fan, etc.) to provide cooling for the battery(ies) located in the battery case 30 during operation.

When the battery case 30 is placed into the opening 22 of the housing 20, for example, guideways 26 can be provided in the housing 20 that guide the battery case 30 to a connector 40. Electrical terminals 42 can be provided on the connector 40 and can extend from a connector front wall 48 to mate with electrical contacts 38 located in the battery case 30. The connector 40 can be located within an aperture/opening 24 through the bottom wall 21 of the housing 20 located between the guideways 26. The connector 40 can include a flange 49 located at a bottom of side walls 44 and beneath aperture/opening 24 such that the housing frame/walls that form the aperture/opening 24 form a rail structure 23 (see FIG. 5) along which the connector 40 can move frontward and rearward (in a forward direction (F)) relative to the housing 20 while being restrained from movement in a vertical direction (V) and transverse direction (T). The forward direction (F) vertical direction (V) and transverse direction (T) all being orthogonal to each other.

Retainer structures 28 can be formed within each opening 22 and configured to lock onto tracks 302 located in each side wall of the battery case 30 to lock or retain the battery case 30 in the housing 20.

Figure 2:
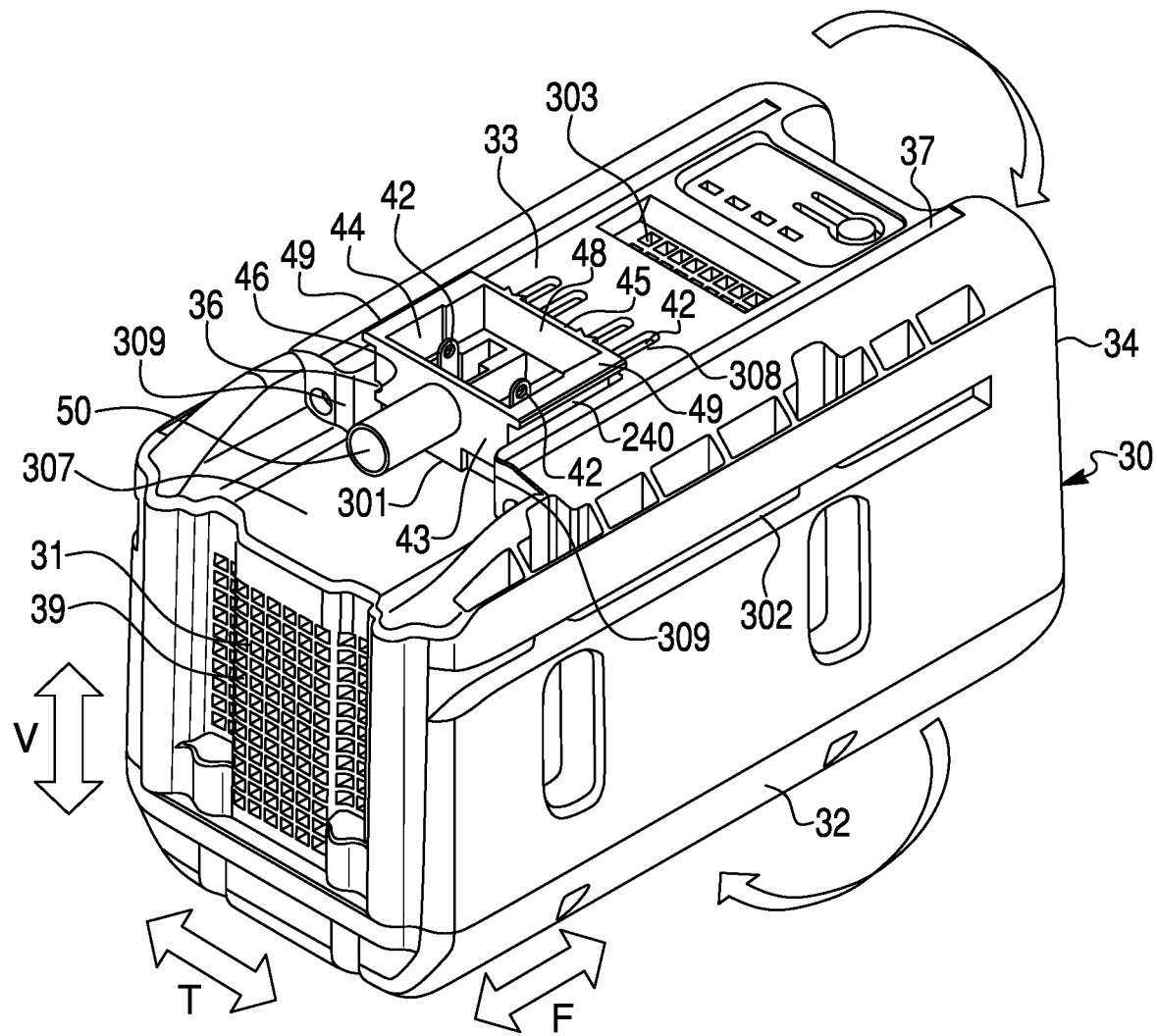
FIG. 2 is a perspective lower view of a battery case and connector for the battery terminal fixing apparatus for battery terminal fixing apparatus for power equipment of FIG. 1.

FIG. 2 is a perspective lower view of the battery case 30 with the connector 40 located therein in a fixed or connected position. The connector 40 can be connected to the battery case 30 in a manner such that connector 40 is locked with respect to the battery case 30 in the vertical (V) and transverse (T) directions while also being urged into contact with each other in the forward direction (F) by both the spring 50 and the frictional connection of the terminals 42 with contacts 38 located in the battery case 30 (described in more detail below with respect to subsequent figures). This connection facilitates the isolation of the connector 40 and battery case 30 from the power equipment to prevent vibration and other forces from being transferred from the power equipment to the connector 40 and battery located in the battery case 30, which in turn protects the electrical connections and protects all of the components of the connector 40 and battery case 30 which can include electronic control units, electronic circuitry, lighting elements, and other components that could be degraded by vibration and other transmitted forces.

The bottom surface 33 of the battery case 30 can include a notch 301 defined by two side walls 309 a front wall 308 and a top wall 307. The top wall 307 can be substantially located in a plane that is spaced from a plane that contains a substantial portion of the bottom surface 33 of the battery case. Thus, the top wall 37 can be spaced from the bottom surface 33 in a vertical direction, and can also be spaced from the lock recess 303 in the vertical direction.

The connector 40 can be located in the notch 301 and the connector front wall 48 can face and contact with the notch front wall 308 when the connector 30 is fully inserted or received in the notch 301. In addition, electrical terminals 42 that extend from a bottom of the connector 40 and through the connector front wall 48 will be placed into electrical communication and contact with electrical contacts 38 (See FIG. 4) of the battery case 30 when the connector 40 is fully inserted or received in the notch 301.

A spring 50 can be provided to keep the connector 40 urged into the fully received position in the notch 301. The spring 50 can be connected to or located adjacent the connector rear wall 43 and located between the connector 40 and the housing 20. The spring 50 can be various elastic structures or devices, such as a coil spring, compression spring, torsion spring, gas spring, flat spring, leaf spring, or other type of elastic or damper device.

Figure 3:
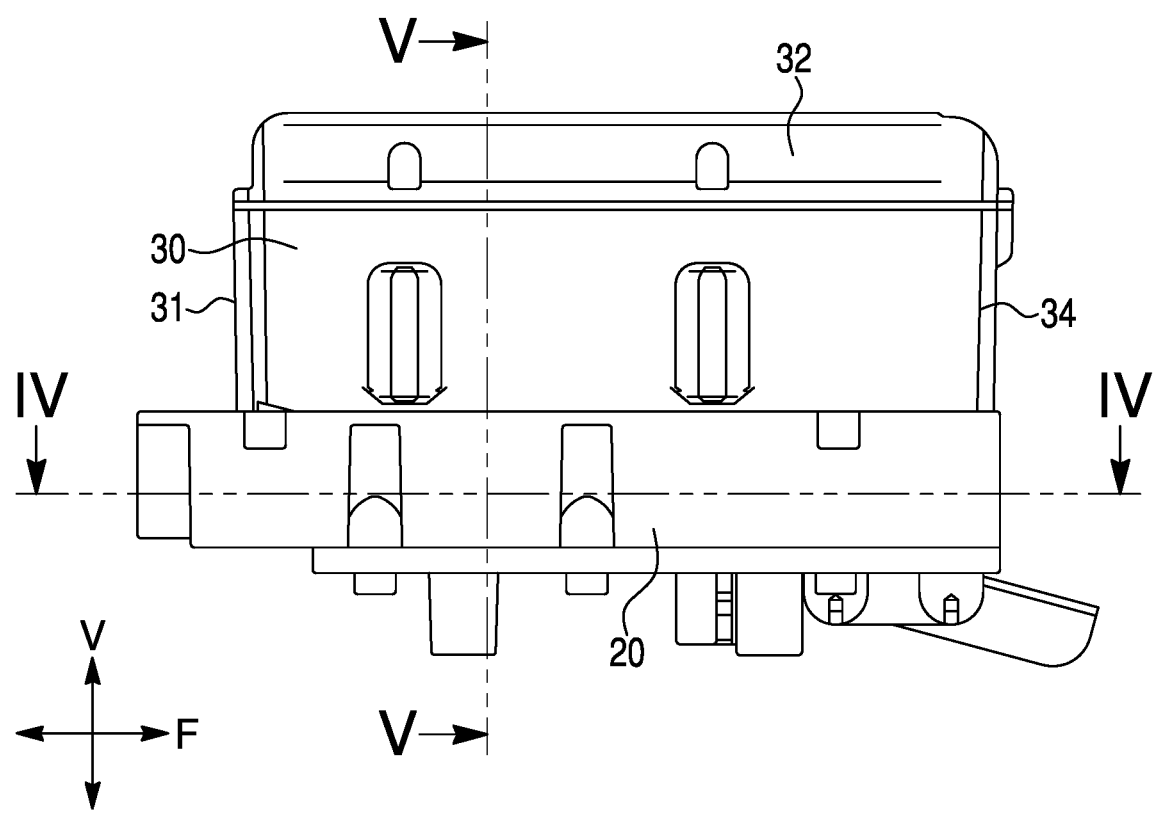
FIG. 3 is a side view of a battery case and partial side view of power equipment housing for battery terminal fixing apparatus for power equipment of FIG. 1.

FIG. 3 is a side view of a battery case 30 and partial side view of power equipment housing 20. In this view, the front wall 31, rear wall 34 and top 32 are shown located above a portion of the equipment housing 20.

Figure 4:
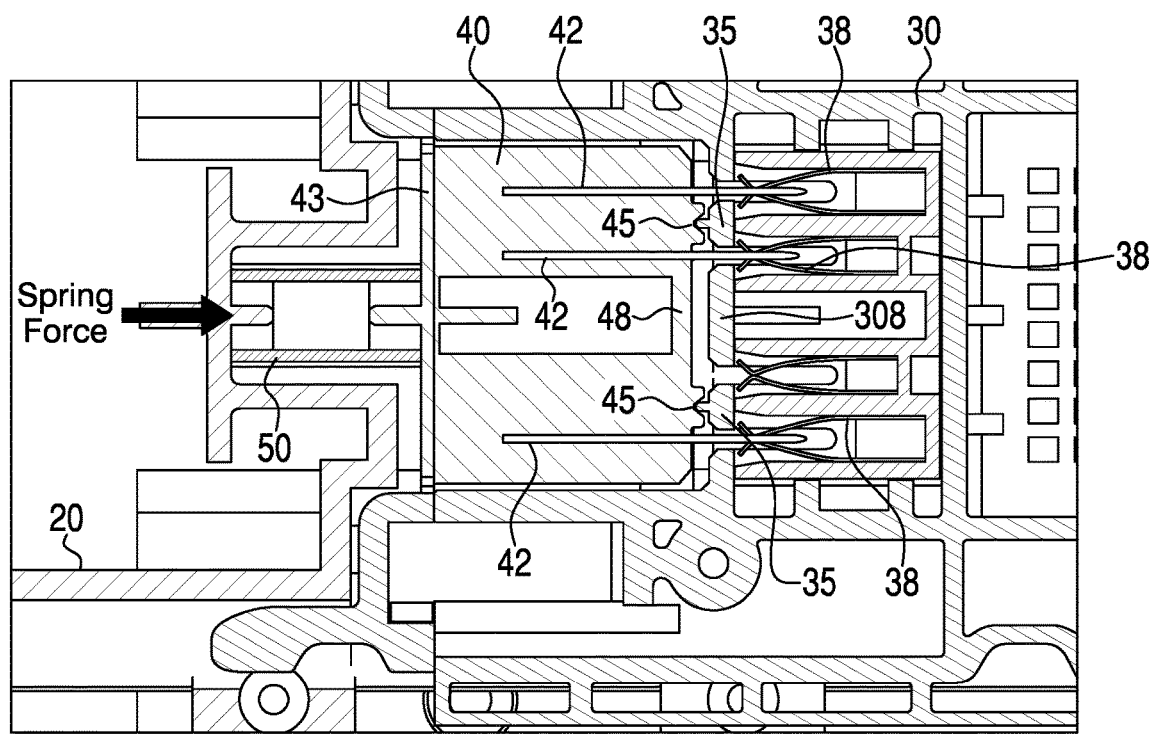
FIG. 4 is a cross-sectional view taken along line IV-IV of FIG. 3.
Figure 4:
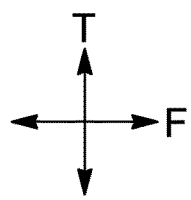

FIG. 4 is a cross-sectional view taken along line IV-IV of FIG. 3. In this view, the connector 40 is shown in the fully inserted or received position with respect to the battery case 30. In this position, each of the terminals 42 of the connector 40 is extended into and frictionally locked within the electrical contacts 38 of the battery case 30. The transverse alignment elements 45 of the connector 40 are located on the connector front wall 48 and are shown in contact with the transverse alignment structures 35 of the battery case 30. In this embodiment, the transverse alignment elements 45 are shown as structures that extend out from a plane of the connector front wall 48 and form a trough therein that has a longitudinal axis that runs in the vertical direction (V) substantially orthogonal (i.e., at a right angle or within 0-10 degrees of being at a right angle) with respect to both the transverse direction (T) and forward direction (F). The transverse alignment structures 35 of the battery case 30 in this exemplary embodiment are shown as rib structures that have a longitudinal axis that also runs in the vertical direction (V) substantially orthogonal (i.e., at a right angle or within 0-10 degrees of being at a right angle) with respect to both the transverse direction (T) and forward direction (F). The rib structures 35 can mate with and extend into the trough of the transverse alignment elements 45 to prevent the connector 40 from moving with respect to the battery case 30 in a transverse (side to side) direction (T). The spring 50 can be located between the housing 20 and a connector rear wall 43 to provide a spring force that pushes the transverse alignment elements 45 into the transverse alignment structures 35. In addition to this spring force, the terminals 42 and electrical contacts 38 can be configured to provide a friction force that keeps the transverse alignment elements 45 in contact with the transverse alignment structures 35 and prevents them from separating from each other.

Figure 5:
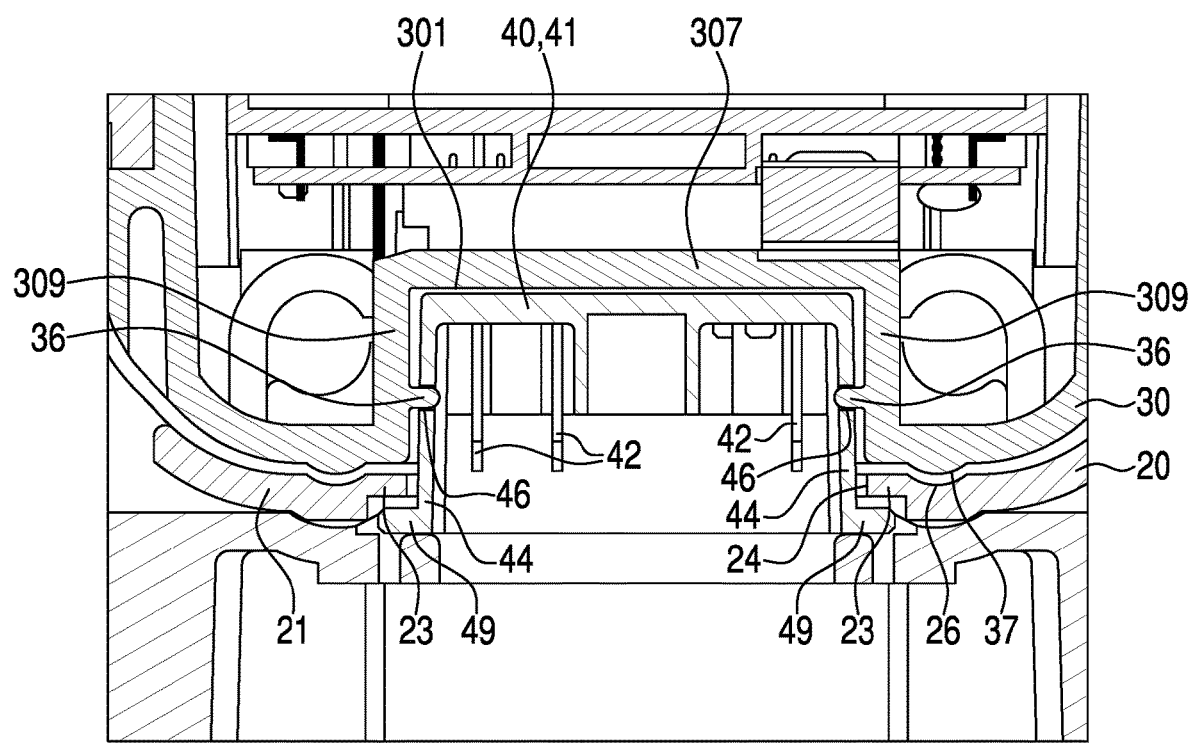
FIG. 5 is a cross-sectional view taken along line V-V of FIG. 3.

FIG. 5 is a cross-sectional view taken along line V-V of FIG. 3. The connector 40 is in the fully retained position in the notch 301 of the battery case 30. The battery case 30 can include vertical alignment structures 36 that mate with and contact vertical alignment elements 46 of the connector 40. The vertical alignment elements 46 of the connector 40 are located on the connector side walls 44. The side walls 44 can be located on opposite sides of a connector top wall 41 and extend substantially orthogonally and downward with respect to the top wall 41. The vertical alignment elements 46 are shown in contact with the vertical alignment structures 36 of the battery case 30. In this embodiment, the vertical alignment elements 46 are shown as slot structures that extend through the side walls 44 and form a trough in the front wall 41 and the rear wall 43. The vertical alignment elements 46 can have a longitudinal axis that runs in a forward direction (F) substantially orthogonal (i.e., at a right angle or within 0-10 degrees of being at a right angle) with respect to both the transverse direction (T) and vertical direction (V). The vertical alignment structures 36 of the battery case 30 in this exemplary embodiment are shown as rib structures that have a longitudinal axis that also runs in a forward direction substantially orthogonal (i.e., at a right angle or within 0-10 degrees of being at a right angle) with respect to both the transverse direction (T) and vertical direction (V). The rib structures 36 can mate with and extend into the troughs and slot of the vertical alignment elements 46 to prevent the connector 40 from moving with respect to the battery case 30 in a vertical (up and down) direction (V).

The connector 40 can also include a flange 49 located at an end or bottom of each the side walls 44. Each flange 49 can be configured to run along a rail structure 23 of the housing 20 to keep the connector 40 restrained in the housing 20 regardless of whether the connector 40 is connected with the battery case 30. The rail structure 23 can simply be a rim that defines the aperture/opening 24 in the bottom wall 21 of the housing 20. FIG. 2 shows a space 240 between the flange 49 and the bottom surface 33 of the battery case 30. The rail structure 23 can extend into this space 240. A guideway(s) 26 of the housing 20 can mate with a guideway(s) 37 of the battery case to align the battery case 30 with the housing 20 when the battery case 30 is initially placed in to or slid onto the housing 20. The guideways 26 can be a trough having a longitudinal axis in the forward direction (F), and the guideways 37 can be a rib having a longitudinal axis in the forward direction (F), or vice versa.

Electrical communication lines (not numbered) can connect the connector 40 to the engine, transmission, motor, distributor, sensors, transformer, or other electrical device of the power equipment to provide power and/or communication thereto from the battery case 30 after the connector 40 is fully received in the battery case 30 and electrical terminals 42 are connected to electrical contacts 38. Electrical communication can be either one-way communication or two-way communication and can be networked or not networked. A controller such as an electronic control unit (ECU) or as a central processing unit can be in electrical communication with the battery of the battery case 30.

While certain embodiments of the invention are described above, it should be understood that the invention can be embodied and configured in many different ways without departing from the spirit and scope of the invention.

For example, any of the male/female connections or relationships can be reversed. Specifically, the female receptacle electrical contacts 38 of the battery case can be replaced with male terminals, and the male electrical terminals 42 of the connector 40 can be replaced with female receptacles to receive the male contacts 38. In addition, the ribs and troughs can be reversed for each of the alignment elements 45, 46 and alignment structures 35, 36. Specifically, transverse alignment elements 45 can be formed as a protrusion or rib while the transverse alignment structures 35 in the front wall 308 can be formed as a slot such as a trough or elongate opening in the battery case 30. Similarly, the vertical alignment elements 46 of the connector 40 can be formed as a protrusion or rib extending outward away from a center of the connector 40 while the vertical alignment structures 36 can be formed as a slot such as a trough or elongate opening in the side walls 309. Any of the above referenced ribs can be configured as a single long rib that extends along a longitudinal axis of the entire structure. However, it is contemplated that the ribs can be formed of multiple elements that each have a longitudinal axis that coincides with the longitudinal axis of the rib, or can be formed of multiple elements such as a plurality of dimples or raised structures that are all aligned along the longitudinal axis of the rib. The trough can be a recess in a wall, or can be a recess in a raised structure, or can be an opening or slot in a wall. The trough can be a single long trough that extends along a longitudinal axis of the entire structure. However, it is contemplated that the trough can be formed of multiple elements that each have a longitudinal axis that coincides with the longitudinal axis of the trough and serve as guiderail-type structure(s) in which the mating rib can reside, or can be formed of multiple elements such as a plurality of indents or raised structures that have indents and are all aligned along the longitudinal axis of the trough. The rib and trough can also consist of a single circular or other shape protrusion and concavity that receives the protrusion to lock the structures together.

The housing 20 is shown as including two openings 22 for receiving two battery cases 30. However, the number of openings 22 and cases 30 can change depending on application, and can be a single opening and single case 30. The opening 22 is shown as a concavity in a frame that makes up the housing 20. However, the opening 22 can be an area on a flat surface of the housing 20 upon which the battery case 30 is attached. In addition, the housing 20 is shown as including guideways 26 that facilitate a sliding (in a forward direction) engagement between the battery case 30 and housing 20. However, it is contemplated that the battery case 30 can simply be placed onto the surface in a vertical (or other) direction with respect to the housing 20, and the terminals 42 of connector 40 can then be caused by spring 50 or user force to slide into or otherwise connect with the electrical contacts 38 in the battery case 30.

Embodiments are disclosed above in the context of a manually adjustable or actuatable connections. However, embodiments are intended to cover automatically adjustable or actuated device, including mechanisms that use or otherwise include motors, processors, etc., to cause the connector 40 to lock into and connect with the battery case 30.

Embodiments are also intended to include or otherwise cover methods of using and methods of manufacturing the disclosed equipment. For example, an exemplary method can include placing a connector 40 for power equipment into contact with the battery case 30 and preventing movement of the connector 40 relative to the battery case 30 in both a transverse direction and vertical direction such that the battery case 30 and connector 40 move as a single unit in the forward direction. The method can also include providing a spring 50 to cause a transverse alignment structure 35 located on the front wall of the battery case 30 to connect with and maintain connection with the transverse alignment element 45 located on the front wall 48 of the connector 40.

What is claimed is:

1. A power equipment battery terminal fixing apparatus, comprising:
    a housing including a frame and a connector biased away from the frame by a spring device; and
    a battery case configured to slide into the frame along a sliding axis, the battery case including a notch defined by a top wall, a first side wall, and a second side wall, the notch located at a bottom surface of the battery case and configured to receive the connector therein, the notch including a first rib protruding from the first side wall and having a longitudinal axis parallel with the sliding axis, and the notch including a second rib protruding from the second side wall and having a longitudinal axis parallel with the sliding axis, wherein
    the connector is configured to be slidingly received in the notch on the bottom surface of the battery case, the connector including electrical contacts and alignment elements on a first side of the connector, and the spring device is located at a second side of the connector opposite the first side of the connector.

2. The power equipment battery terminal fixing apparatus of claim 1, wherein
    the connector includes,
        a first connector side wall that has a top, a bottom, and a first slot that is located between the top and bottom of the first connector side wall and that extends parallel with the sliding axis when the connector is received in the notch such that the first rib of the battery case is located in the first slot of the connector when the connector is received in the notch, and
        a second connector side wall that has a top, a bottom, and a second slot that is located between the top and bottom of the connector second side wall and that extends parallel with the sliding axis such that the second rib of the battery case is located in the second slot of the connector when the connector is received in the notch.

3. The power equipment battery terminal fixing apparatus of claim 1, wherein
    the notch is further defined by an end wall that extends between the first side wall, the second side wall, and the top wall of the battery case, the end wall including alignment structures that mate with the alignment elements, respectively, of the connector when the connector is fully received in the notch.

4. The power equipment battery terminal fixing apparatus of claim 3, wherein
    the alignment elements and alignment structures are configured to prevent side to side movement of the connector relative to the battery case when the connector is fully received in the notch.

5. The power equipment battery terminal fixing apparatus of claim 4, wherein
    the first rib mates with a first slot in the connector and the second rib mates with a second slot in the connector, and the first and second ribs and first and second slots are configured to prevent up and down movement of the connector relative to the battery case when the connector is fully received in the notch, wherein the up and down movement is substantially orthogonal to the side to side movement.

6. The power equipment battery terminal fixing apparatus of claim 3, wherein
    the spring device is configured to force the alignment elements of the connector into contact with the alignment structures of the battery case when the connector is fully received in the notch of the battery case.

7. The power equipment battery terminal fixing apparatus of claim 3, wherein
    the electrical contacts of the connector are configured as terminals that extend from an end face of the connector, and the alignment elements are located on the end face of the connector and between the terminals.

8. The power equipment battery terminal fixing apparatus of claim 1, wherein
    the alignment elements on the first side of the connector are troughs that each have a longitudinal axis that is substantially perpendicular to the sliding axis and substantially perpendicular to a side to side transverse axis of the apparatus.

9. The power equipment battery terminal fixing apparatus of claim 1, wherein
    the connector includes a pair of connector side walls extending between the first side of the connector and the second side of the connector, a top connector wall is located at and extends between a top of each of the pair of connector side walls, and a flange is located at a bottom of each of the pair of side walls, each flange extending outward away from a central portion of the connector.

10. The power equipment battery terminal fixing apparatus of claim 9, wherein
    the frame includes a hole and the connector protrudes through the hole while each flange abuts and is configured to slide on a bottom of the frame adjacent to the hole.

11. A power equipment battery terminal fixing apparatus, comprising:
    a housing including a frame defining a surface and having a rail structure, the housing having a transverse direction, a vertical direction, and a forward direction, each direction being orthogonal to each other;
    a connector moveably connected to the housing and configured to move along the rail structure in the forward direction, the connector including a transverse alignment element and a vertical alignment element and at least one electrical terminal;
    a spring located between the connector and the housing; and
    a battery case configured to be placed on the surface of the housing to connect a battery located in the battery case to the at least one electrical terminal of the connector, the battery case including a transverse alignment structure configured to mate with the transverse alignment element of the connector to prevent movement of the connector relative to the battery case in the transverse direction when the battery case is connected to the connector, and the battery case further including a vertical alignment structure configured to mate with the vertical alignment element of the connector to prevent movement of the connector relative to the battery case in the vertical direction when the battery case is connected to the connector, wherein the battery case includes at least one electrical contact configured to mate with the at least one electrical terminal of the connector, and at least one of the transverse alignment element and vertical alignment element is located on a first side of the connector, and the spring is located at a second side of the connector opposite the first side of the connector.

12. The power equipment battery terminal fixing apparatus of claim 11, wherein
the connector includes,
a first side connector wall that has a top and a bottom, and the vertical alignment element includes a first slot located between the top and bottom of the first connector side wall, and the first slot extends parallel with the forward direction, and the vertical alignment structure of the battery case is located in the first slot of the connector when the at least one electrical contact of the battery case is mated with the at least one electrical terminal of the connector, and
a second connector side wall that has a top and a bottom, and the vertical alignment element includes a second slot located between the top and bottom of the second connector side wall, and the second slot extends parallel with the forward direction, and the vertical alignment structure of the battery case is located in the second slot of the connector when the at least one electrical contact of the battery case is mated with the at least one electrical terminal of the connector.

13. The power equipment battery terminal fixing apparatus of claim 11, wherein
the battery case includes a notch defined by a notch end wall that extends between a first notch side wall and a second notch side wall, the notch is configured to receive the connector therein when the at least one electrical contact of the battery case is mated with the at least one electrical terminal of the connector, and the notch end wall includes the transverse alignment structure that mates with the transverse alignment element of the connector when the connector is fully received in the notch.

14. The power equipment battery terminal fixing apparatus of claim 11, wherein
the connector is configured to move along the rail structure in the forward direction, and the spring is configured to force the transverse alignment element of the connector into contact with the transverse alignment structure of the battery case when the at least one electrical contact of the battery case is mated with the at least one electrical terminal of the connector.

15. The power equipment battery terminal fixing apparatus of claim 11, wherein
the connector includes a plurality of electrical terminals that extend from an end face on the first side of the connector, and the alignment element includes at least one of a plurality of indents and a plurality of protrusions, and each of the at least one of a plurality of indents and a plurality of protrusions is located on the end face of the connector and between the terminals.

16. The power equipment battery terminal fixing apparatus of claim 11, wherein
the connector includes a pair of connector side walls extending between the first side of the connector and the second side of the connector, a connector top wall located at and extending between a top of each of the pair of connector side walls, and a flange located at a bottom of each of the pair of connector side walls, each flange extending outward away from a central portion of the connector, wherein each flange is configured to run along the rail structure to guide the connector in movement in the forward direction while preventing movement of the connector in the vertical direction.

17. A power equipment battery terminal fixing apparatus, comprising:
a housing having a transverse direction, a vertical direction, and a forward direction, each direction being orthogonal to each other;
a connector moveably connected to the housing, the connector including a transverse alignment element, a vertical alignment element, a connector front wall, and at least one electrical terminal protruding from the connector front wall;
a spring located between the connector and the housing; and
a battery case configured to be placed on the housing to connect a battery located in the battery case to the at least one electrical terminal of the connector, the battery case including a transverse alignment structure configured to mate with the transverse alignment element of the connector to prevent movement of the connector relative to the battery case in the transverse direction when the battery case is placed on the housing, and the battery case further including a vertical alignment structure configured to mate with the vertical alignment element of the connector to prevent movement of the connector relative to the battery case in the vertical direction when the battery case is placed on the housing, wherein
the battery case includes an end wall at which at least one electrical contact is located, and the transverse alignment structure is located on the end wall of the battery case, and the transverse alignment element is located on the connector front wall of the connector such that the transverse alignment structure and the transverse alignment element contact each other when the battery case is placed on the housing and the at least one electrical terminal of the connector is in electrical contact with the at least one electrical contact of the battery case, and
the spring is configured to bias the connector in the forward direction such that the transverse alignment structure of the battery case contacts the transverse alignment element of the connector.

18. The power equipment battery terminal fixing apparatus of claim 17, wherein
the connector includes,
a first connector side wall that has a top and a bottom, and the vertical alignment element includes a first slot located between the top and bottom of the first connector side wall, and the first slot extends parallel with the forward direction, and the vertical alignment structure of the battery case is located in the first slot of the connector when the at least one electrical contact of the battery case is mated with the at least one electrical terminal of the connector, and
a second connector side wall that has a top and a bottom, and the vertical alignment element includes a second slot located between the top and bottom of the second connector side wall, and the second slot extends parallel with the forward direction, and the vertical alignment structure of the battery case is located in the second slot of the connector when the at least one electrical contact of the battery case is mated with the at least one electrical terminal of the connector.

19. The power equipment battery terminal fixing apparatus of claim 17, wherein the battery case includes a first side wall, a second side wall, and a notch defined by the end wall that extends between the first side wall and the second side wall, the notch is configured to receive the connector therein when the at least one electrical contact of the battery case is mated with the at least one electrical terminal of the connector, and the end wall of the battery case includes the transverse alignment structure that mates with the transverse alignment element of the connector when the connector is fully received in the notch.

20. The power equipment battery terminal fixing apparatus of claim 17, wherein the housing incudes a first rail having a longitudinal axis parallel with the forward direction and a second rail having a longitudinal axis parallel with the forward direction;

the connector includes a first connector side wall and a second connector side wall, the first connector side wall including a flange located at a bottom of the first connector side wall and configured to be retained by and move within the first rail in the forward direction, and the second connector side wall including a flange located at a bottom of the second connector side wall and configured to be retained by and move within the second rail in the forward direction, and the vertical alignment element includes one of a slot and a rib in the first side wall and having a longitudinal axis parallel with the forward direction, and one of a slot and a rib in the second side wall and having a longitudinal axis parallel with the forward direction.

* * * * *